A. S. HUBBARD.
SYSTEM OF ELECTRICAL DISTRIBUTION.
APPLICATION FILED AUG. 16, 1905.
952,332. Patented Mar. 15, 1910.
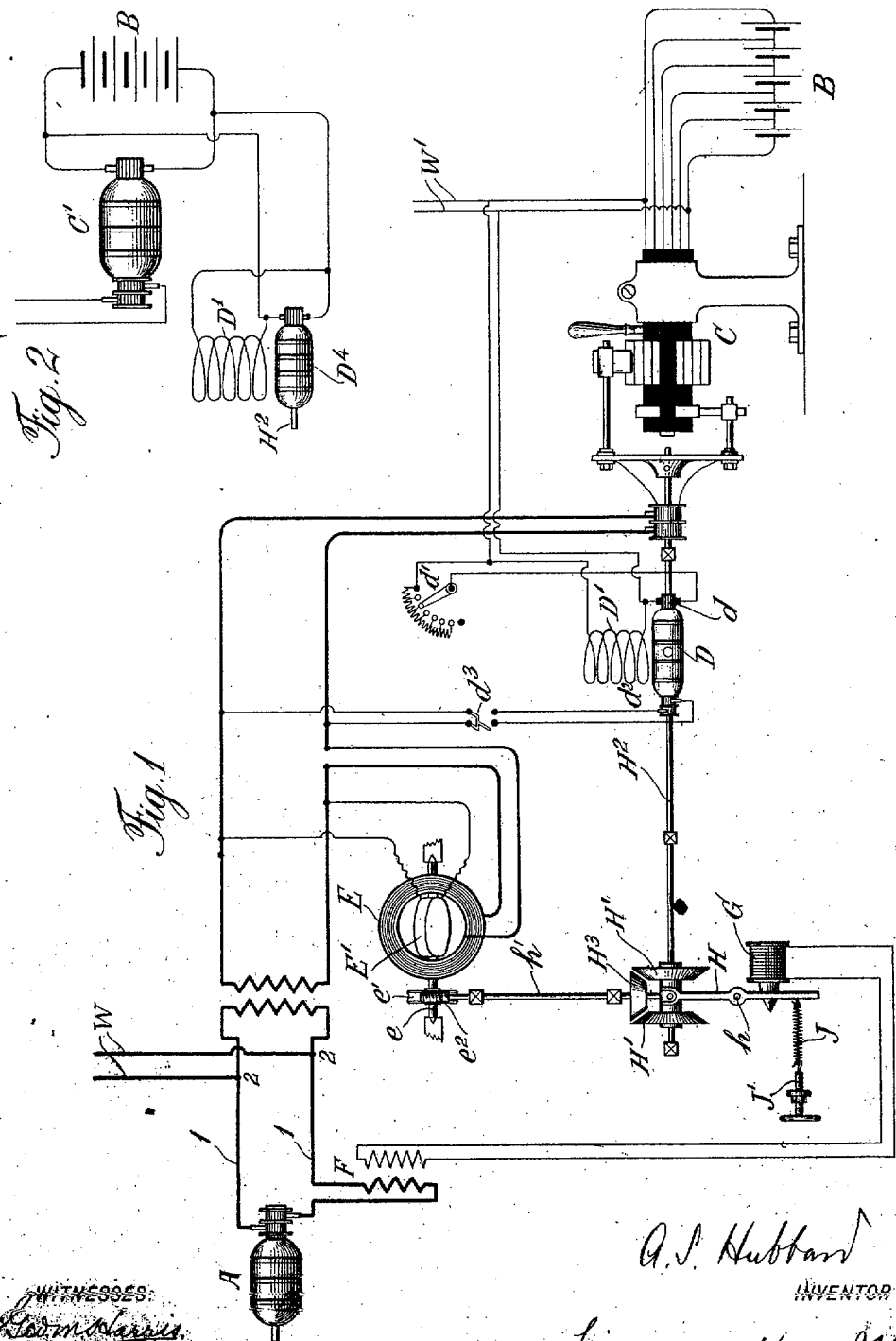

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

SYSTEM OF ELECTRICAL DISTRIBUTION.

952,332.     Specification of Letters Patent.     Patented Mar. 15, 1910.

Application filed August 16, 1905. Serial No. 274,363.

*To all whom it may concern:*

Be it known that I, ALBERT S. HUBBARD, a citizen of the United States, and a resident of Belleville, Essex county, State of New Jersey, have invented certain new and useful Improvements in Systems of Electrical Distribution, of which the following is a specification.

My invention relates to electrical systems of distribution and is especially directed to the employment of storage batteries in connection with alternating current circuits.

Generally speaking it is the object of my invention to provide means to satisfactorily regulate the charge or discharge of a storage battery from or to an alternating current circuit.

My invention also includes the employment of a storage battery as an auxiliary to an alternating current generator to steady the load on the latter, the current in the storage battery being regulated to maintain the generator load as nearly constant as practicable.

It is another object of my invention to regulate satisfactorily storage batteries working in connection with an alternating current circuit, where the direct current of the battery is changed to an alternating current by an apparatus that varies the number of cells in circuit and reverses the connection of the battery to the circuit, or where the alternating current of an alternating current generator is used to charge the battery by employing such cell varying and reversing apparatus working in synchronism with the alternating current generator.

Other objects of my invention relate to more specific features of the system as will hereinafter appear.

To these ends I regulate the battery current by providing, between the battery and the alternating current generator or the alternating current translating device, an alternating current source of electro-motive force that may be varied to fit the needs of the system. This supplemental alternating current electro-motive-force may be in a direction to add itself to the electro-motive-force of the circuit or to oppose the electro-motive-force of the circuit, or by reversing, to either add its electro-motive-force to the circuit or to subtract its electro-motive force from the circuit, as desired. Its regulation may be either manually or automatically effected, although my invention also includes specific means for automatic regulation.

Where the battery is in an auxiliary circuit I place the variable source of alternating current electro-motive force in the auxiliary circuit and I provide means for automatically regulating this supplemental alternating current electro-motive-force in accordance with the load variations on the main alternating current generator. The means that I employ comprise a transformer, the secondary of which is in series with the battery and its commutating apparatus, and mechanism to control the action of this transformer, which mechanism is controlled by a coil connected so that its current is responsive to current changes in the alternating current generator. This can be effected by employing a transformer whose primary coil is in series with the main alternating current generator and whose secondary coil is connected to supply current to the coil that directly controls the said mechanism.

More specific features of importance involved in my invention will appear hereinafter.

Referring to the drawings accompanying this specification, Figure 1 is a diagram illustrating one embodiment of my invention. Fig. 2 shows a modification of the portion of the system connecting the alternating current and direct current circuits.

A is an alternating current generator supplying current to the work circuit W.

B is a storage battery which is to act in the system illustrated as an auxiliary to steady the load on the generator A, the battery being regulated to discharge when the load on the generator A increases and charge when the load on the generator A decreases.

W' indicates a direct current work circuit which may be provided if desired.

C represents a device for progressively varying the number of cells in circuit and for reversing their connection to the circuit so that from instant to instant the battery is giving a different voltage and at short intervals the direction of the battery voltage relative to the conductors of the alternating current circuit is reversed, thus producing an alternating current. In United States patent to Ball, No. 697,192, dated April 8th, 1902, details of this apparatus are fully shown and described and I will not, therefore, go into details respecting it in this specification.

Apparatus C is driven by a motor armature D having a field coil $D^1$ directly connected to the terminals of the storage battery, so as to receive a continuous current. The motor armature D has its winding connected to a commutator $d$, which may be connected through a rheostat $d'$ with the terminals of the battery. The windings of the armature D are also connected to the rings $d^2$, which, through switch $d^3$, may be connected to the alternating current side of the system. By this arrangement I am enabled to start the armature D at any time by closing the direct current circuit through the rheostat $d'$ and then, when the motor has been thus brought up to synchronous speed, the switch $d^3$ may be closed and the circuit opened at rheostat $d'$. It is important that the brushes of apparatus C shall be rotated by the motor at synchronous speed, so that the current produced by the shifting of the battery cells shall be in phase with the current of the alternating current generator.

The variable source of electro-motive-force in the alternating current portion of the auxiliary circuit is shown as a transformer having a secondary coil E directly in the auxiliary circuit, so that it receives any current going from the battery to the work circuit W, or any current going from the main generator to charge the battery. I will now describe the means I employ to vary the electro-motive-force in secondary E and so regulate the action of the battery. E' is the primary coil of the said transformer and may be constantly connected in shunt to the alternating current circuit. This coil E' is mounted on a rotatable shaft $e$ carrying a worm wheel $e'$ which will be rotated to change the angular position of coil E' by revolving the screw $e^2$. The electro-motive-force in coil E produced by the action of the current in the coil E' upon the coil E will depend upon the relative angular position of the two coils, and to control this angular position I provide means to govern the movement of the screw $e^2$. This is effected in the following manner. At F is a transformer whose primary is in the alternating current generator branch of the system, so that the current in the primary varies directly in accordance with changes of generator load. The current induced in the secondary of transformer F will also vary accordingly. The current induced in this secondary is utilized in the regulating coil G which is thus made responsive to generator load changes, and this coil acts upon the lever H, pivoted at $h$, and engaging the rotating friction wheels H', which are keyed to an extension $H^2$ of the shaft of the armature D. Any increase, therefore, of current in the coil G tends to move the lower end of lever H to the right causing an engagement between the right hand friction wheel H' and a friction wheel $H^3$ fixed with the shaft $h$, which carries the screw $e^2$. Therefore, an increase of current in the coil G will tend to rotate wheel $H^3$ and screw $e^2$ from left to right and turn the primary coil E' in one direction while any reduction of current in the coil G will tend to produce movement of the primary coil E' in the opposite direction.

When the coil E' is at right angles to the coil E then there will be no electro-motive-force produced in the coil E since at this position the lines of force produced by the energizing current of the coil E' will not pass through the coil E in the proper direction to produce useful induction. When the coil E' is concentric with the coil E then the maximum induction takes place, the electro-motive-force produced by the coil E being in one direction or another according to which side of the coil E' has moved upwardly, that is, according to the relation between the relative direction of the currents of the two coils. In the intermediate positions intermediate electro-motive-forces are generated by the coil E'.

In order to oppose the action of the coil G and to definitely determine the load that shall be permitted to fall upon the generator A, I provide a manually adjustable means for opposing the action of the coil G upon the variable source of alternating current electro-motive force. This comprises the spring J which acts upon lever H in an opposite direction to that in which coil G works, the force of this spring being adjusted by turning the screw J'. Thus, if it is desired to add another alternating current generator at some portion of the day when the average load on W increases, the tension of spring J is adjusted so that considerably more current will have to flow in coil G before the apparatus becomes adjusted to the position that will provide zero electro-motive force in coil E.

It will be noted that the generator circuit, comprising the conductors 1, 1, are connected to the working circuit at points 2, 2, and that all the conductors to the right of 2, 2, are connected with the auxiliary circuit, and thus the auxiliary circuit is an alternating current circuit down to the commutating device C, but a direct current circuit to the right of that device. I, therefore, govern the flow of current in the direct current portion of the circuit entirely by apparatus placed in the alternating portion of the circuit.

My arrangement enables me, and I prefer to design the battery and the various parts of the apparatus so that the battery will neither charge nor discharge when the current in the generator A is at the desired average, and at this time I prefer that the secondary E will be producing no electromotive-force. These are, however, matters of design and adjustment. My invention enables me to produce satisfactorily with a battery working in connection with an alternating current system, all that can be done with a battery working with a direct current system.

It will be obvious that certain features of my invention are useful whether the battery forms the sole source of supply for an alternating current system, or whether, on the other hand, it always discharges to a direct current system and is only charged from an alternating current system.

In Fig. 2, I show a modification which may be employed. Here, instead of employing the ball commutating device C, I have provided a rotary converter C′, the alternating current conductors of which would be connected exactly as the alternating current conductors leading from the ball apparatus are connected. In this case the motor D⁴ is only needed to drive the wheels H′, H′. Both in the case of Fig. 1 and the case of Fig. 2, the action of the battery is controlled by the transformer E, E′ which is reversible and in the sense that the term is ordinarily used in the art, is an alternating current booster. Whether or not this booster always adds electro-motive-force or subtracts electro-motive-force, or sometimes adds and sometimes subtracts, is a matter for adjustment to mere local conditions. In ordinary practice, where the full system shown is employed, the effort is to adjust the system so that when the average load desired is upon the main generator, the coil E′ will be at the position in which no electro-motive-force will be generated by the coil E, while the battery voltage will be just sufficient so that it will neither receive nor give out current. When the generator load is high the coil E′ will be in such a position as to cause an electro-motive-force to be generated in the coil E in a direction to add to the battery electro-motive-force so that the battery may discharge, while at such times as the generator load is low the coil E′ takes an opposite position and so causes the coil E to generate an electro-motive-force that will add itself to the generator electro-motive-force and cause the battery to charge. This condition is, of course, an ideal one and in practice the alternating current booster may sometimes have an electro-motive-force opposed to the current flow in the battery branch.

Having thus fully described my invention, what I claim, and desire to protect by Letters Patent, is:—

1. The combination with a main alternating current generator and an alternating current distribution circuit connected thereto, of an auxiliary circuit connected to the generator and containing a storage battery, a reversible alternating current generator of electromotive force in operative relation to the auxiliary circuit, means for positively causing said reversible generator to operate responsively to variations in said alternating current circuit, and current converting means in said auxiliary circuit.

2. The combination with a main alternating current generator and an alternating current distribution circuit connected thereto, of an auxiliary circuit connected to the generator and containing a direct current source of electricity, an alternating current generator of electromotive force in the auxiliary circuit, means for positively causing said last mentioned alternating current generator to operate responsive to variations in said alternating current circuit, and interposed means for converting direct current into alternating current or vice versa.

3. The combination with a main alternating current generator and an alternating current work circuit, of an auxiliary circuit in operative relation to the generator and containing a storage apparatus, an alternating current generator of electromotive force in the auxiliary circuit, means for compelling said last mentioned alternating current generator to operate responsive to variations in the alternating current circuit, and an interposed commutating device.

4. The combination with a main alternating current generator and an alternating current work circuit, of an auxiliary circuit in operative relation to the generator and containing a storage battery, an alternating current source of electromotive force in operative relation with the auxiliary circuit, means for positively operating said source responsive to changes in said alternating current circuit, and an interposed commutating device for varying the number of battery cells in circuit, and for reversing the connections thereof.

5. The combination with a main alternating current generator and an alternating current work circuit, of an auxiliary circuit in operative relation to the generator and containing a storage battery, a reversible alternating current source of electromotive force in the auxiliary circuit, means for positively controlling said source to compel it to operate responsive to changes in said work circuit, and an interposed commutating device connected and arranged to vary the number of battery cells in circuit, and to reverse connections therefrom to produce an alternating current corresponding to that of said main alternating current generator.

6. The combination with a main alternating current generator and an alternating current work circuit, of an auxiliary circuit in operative relation to the generator and containing a storage battery, means for progressively changing the number of battery cells in circuit and reversing their connection in circuit to produce an alternating current, and alternating current means for positively controlling the battery action in accordance with changes in the alternating current circuit.

7. The combination with a storage battery, of apparatus for progressively changing the number of battery cells in circuit and reversing their connection in circuit, an alternating current work circuit in operative relation to said apparatus, means for regulating the electromotive force impressed upon said work circuit, and means for positively compelling said regulating means to operate responsive to variations in said alternating current circuit.

8. As a means for regulating the charge and discharge of storage batteries, apparatus for converting direct current into alternating current connected to the storage battery, an automatic alternating current booster in series with said apparatus, and alternating current means for compelling said booster to operate responsive to variations in the alternating current.

9. Apparatus for regulating the charge or discharge of a storage battery from or to an alternating current circuit comprising means for converting alternating current into direct current and vice versa, a transformer having one of its coils in series with the battery and means for positively controlling and reversing the electromotive force of said coil responsive to changes in said alternating current circuit.

10. An apparatus for regulating the charge or discharge of a storage battery from or to an alternating current circuit, comprising means for converting alternating current into direct current or vice versa, a transformer having one of its coils in series with said converting means and means for positively compelling one of the transformer coils to vary its angular position to vary the electromotive force of the transformer coil in series with the battery directly responsive to variations in said alternating current circuit.

11. A main alternating current generator, a storage battery, means for converting alternating current into direct and vice versa, a transformer having one of its coils between said means and the main generator, a regulating coil independent of said transformer and directly and positively responsive to alternating current load changes and means for causing said coil to act upon the transformer to vary the electromotive force thereof.

12. The combination with a main alternating current generator and an alternating current work circuit, of an auxiliary circuit connected to the generator and containing a storage battery, an alternating current generator of electromotive force in series with the battery, and interposed means for converting direct current into alternating current or vice versa, a coil in the circuit of the main generator, and means for causing variations of current in said coil to act upon said alternating current generator of electromotive force.

13. A main alternating current generator, an alternating current work circuit, an auxiliary circuit containing a storage battery, apparatus for varying the number of battery cells in circuit and for reversing their connection in circuit, a transformer having a winding in the auxiliary circuit, apparatus acting on the transformer to vary the electromotive force of said winding and a regulating coil for said apparatus directly and positively responsive to alternating current load changes.

14. The combination with a main alternating current generator and an alternating current work circuit, of an auxiliary circuit containing a storage battery, an alternating current source of electromotive force in said auxiliary circuit, an interposed means for converting direct current into alternating current or vice versa, and means in the circuit of the main generator for regulating said alternating current source responsive to variations in the electrical condition of the system.

15. In a system of electrical distribution, the combination of a source of alternating current and its circuit, a storage battery, converting apparatus between said source and battery, a transformer in series with the battery, and having one coil movable relatively to the other, a constantly rotating member and means for mechanically connecting said movable coil with said member, said means being responsive to load changes on said source of alternating current.

16. The combination of an alternating current distribution circuit, a storage battery in operative relation thereto, converting apparatus connected to said storage battery, an alternating current booster in series with said apparatus and means in said alternating current circuit for automatically regulating said booster responsive to variations in the alternating current.

17. The combination of an alternating current generator and circuit, an auxiliary circuit, a storage battery connected thereto, a reversing commutator and an alternating current booster in the auxiliary circuit, a direct current starting device for said commutator, means for operating said commutator in synchronism with the alternating current generator, and means in the alternating current circuit for regulating the action of said booster.

18. In an electrical system of distribution, the combination of an alternating current distribution circuit, an auxiliary circuit in operative relation thereto, a battery, a converting device and a source of alternating current electromotive force connected to the auxiliary circuit and a regulating transformer responsive to variations in the electrical condition of the system.

19. In an electrical system of distribution, the combination of an alternating current distribution circuit, an auxiliary circuit in operative relation thereto, a storage apparatus, a converting device and a source of alternating current electromotive force in the auxiliary circuit and a transformer connected to said distribution circuit for regulating the action of said source responsive to load changes in said distribution circuit.

20. In a system of electrical distribution, the combination of a source of alternating current and its circuit, a storage battery, converting apparatus between said source and battery, a transformer in series with the battery and having one coil movable relatively to the other, a constantly moving member, electromagnetic means for operatively connecting said movable coil with said member responsive to changes in said alternating current circuit.

21. In a system of electrical distribution, the combination of a source of alternating current and its circuit, a storage battery, converting apparatus between said source and battery, a transformer in series with the battery and having one coil movable relatively to the other, a plurality of rotating disks, means for rotating said disks, means for mechanically connecting either of said disks with said movable transformer coil responsive to variations in the alternating current circuit.

22. A system of electrical distribution comprising the combination of a source of alternating current and its circuit, a source of direct current and its circuit, transforming apparatus operatively connected between the two sources, and means responsive to fluctuations on the alternating current circuit for compelling the transfer of energy in either direction between the direct current source and the alternating current circuit, said means including a source of electromotive force connected in series between the alternating current terminals of the transforming apparatus and the alternating current circuit, substantially as described.

23. A system of electrical distribution comprising the combination of a source of alternating current and its circuit, a storage battery and its direct current circuit, transforming apparatus operatively connected between the two circuits, and means responsive to fluctuations on the alternating circuit, for compelling the transfer of energy in either direction between the storage battery and the alternating current circuit, said means including a source of electro-motive force connected in series between the alternating current terminals of the transforming apparatus and the alternating current circuit, substantially as described.

24. The combination of an alternating current generator and circuit therefrom, a direct current circuit and a storage apparatus connected thereto, suitable transforming provisions operatively connecting said circuits, a source of alternating current electromotive force, and means for regulating the same operatively related to the alternating current circuit.

In testimony whereof, I have signed my name to this specification, in the presence of two subscribing witnesses.

ALBERT S. HUBBARD.

Witnesses:
CHARLES R. LA RUE,
GEO. M. HARRIS.